June 25, 1929.  J. D. SARTAKOFF  1,718,708
DEVICE PARTS AND METHOD OF SEALING THE SAME
Filed July 13, 1927   2 Sheets-Sheet 1
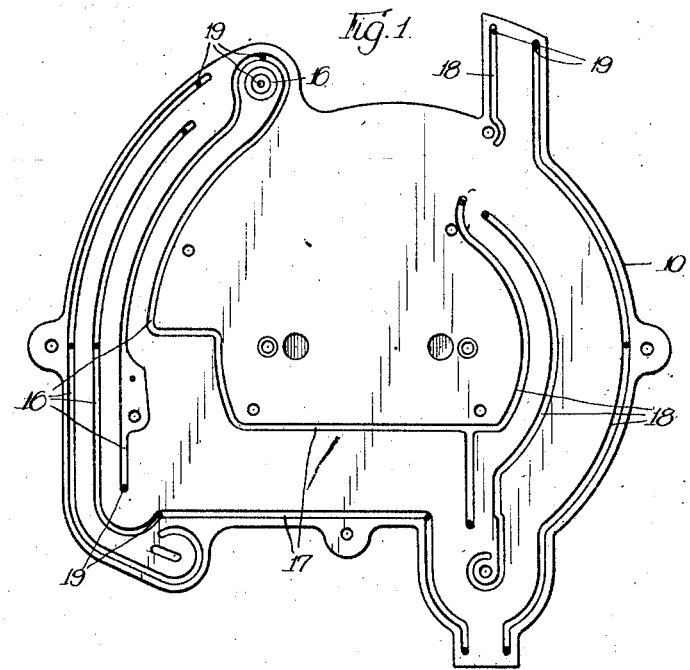
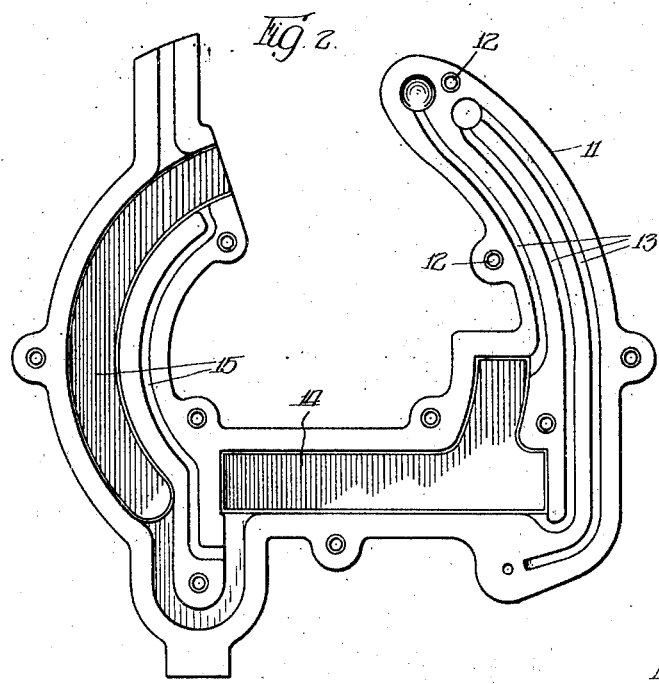

June 25, 1929. J. D. SARTAKOFF 1,718,708
DEVICE PARTS AND METHOD OF SEALING THE SAME
Filed July 13, 1927 2 Sheets-Sheet 2
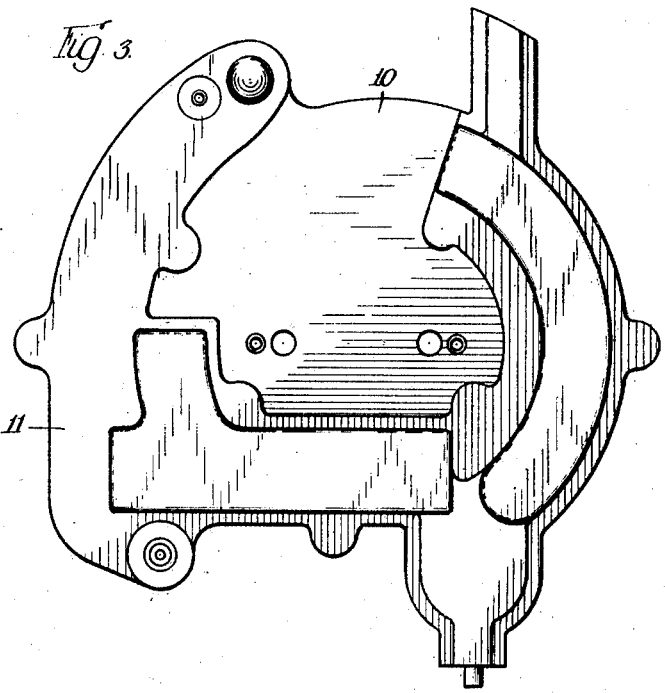
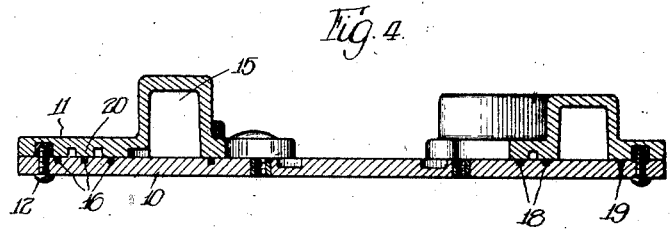
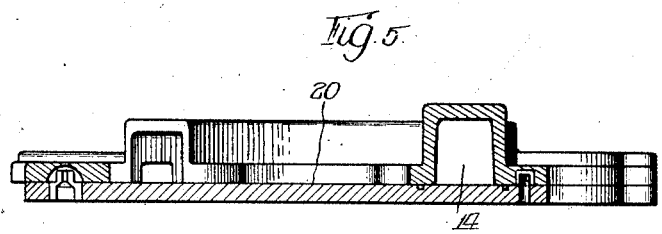
Inventor:
Jack D. Sartakoff,
Witness:
R. Burkhardt.

Patented June 25, 1929.

1,718,708

UNITED STATES PATENT OFFICE.

JACK D. SARTAKOFF, OF NEW YORK, N. Y., ASSIGNOR, BY MESNE ASSIGNMENTS, TO THE WAYNE PUMP COMPANY, OF BALTIMORE, MARYLAND, A CORPORATION OF MARYLAND.

DEVICE PARTS AND METHOD OF SEALING THE SAME.

Application filed July 13, 1927. Serial No. 205,349.

The invention pertains to a method for fastening materials together, and more particularly to means for forming and positively sealing together casing parts of an instrument in a manner to prevent fluid leakage and it also pertains to the specific parts to be united.

In assembling devices such as containers or fluid control or registering meters, it has heretofore been necessary to fasten the different parts together by a great number of mechanical devices, such as screws or bolts, with the danger in use of the device that such parts may work loose or warp causing a loss of the fluid or material from the device with the attendant loss to and of the device. Or, it has been the practice in sealing parts, especially surfaces thereof, to first apply cement to one part and then placing and holding another part in juxtaposition to said part for a comparatively long period of time. With all this trouble, these methods have been very unsatisfactory due to the fact that a positive sealing is difficult to obtain.

It is therefore an object of this invention to provide a method of sealing parts of a device wherein few fastening means need to be used.

Another object is to provide a method of sealing parts of a device utilizing capillary attraction to insure a sealing action over the entire surfaces so sealed.

A further object is to provide a method of sealing parts of a device wherein it is only necessary to introduce sealing means at certain points in an assembly to secure sealing between such parts over entire juxtaposed surfaces.

Other, further and more specific objects will readily occur from the detailed description, claims and drawings appended hereto.

In the drawings, wherein like reference characters are used to designate like parts—

Figure 1 is a plan of a part (the base) of a gauge, showing means provided therein for accommodating a sealing substance.

Figure 2 is a plan of another part of the gauge adapted to be fastened and sealed to the parts shown in Figure 1;

Figure 3 is a plan of the assembly of the parts shown in Figures 1 and 2;

Figure 4 is a section taken substantially on the plane as indicated by the line 4—4 of Figure 3; and Figure 5 is a section taken substantially on the plane as indicated by the line 5—5 of Figure 3.

In the specific employment of the proposed method to be particularly described to the device shown, it has been proposed to seal parts of said device (a mercury gauge) in operative relation to each other, this device being shown and described with more particularity in the co-pending application, Serial #147,443, Sartakoff, filed November 10, 1926.

In a device or gauge of this sort, the base 10 is made of any suitable material, such as a shellac compound or celluloid, the top receiving and contacting surface of said base being ordinarily substantially a plain surface. The top 11 or fluid (mercury) containing part of the gauge is made of any suitable material, such as celluloid, and is provided with means cooperating with means on the base 10 for receiving fastening screws or bolts 12 for positioning the parts in a certain position with reference to each other. In general in this particular gauge, the top 11 is provided with suitable air channels 13, a suitable mercury reservoir 14 and other suitable mercury and air channels 15 of a configuration to meet service requirements. The bottom 10 is provided with cementing channels 16, 17 and 18 so disposed that when the top 11 is fastened by means of the screws 12 to the base 10, these cementing channels will at no place directly communicate with the channels provided in the top; that is, these cementing channels will be disposed between the operating channels provided in the top, or between said channels and a portion of the base. At suitable intervals in these cementing channels, access is had to them through the base by means of small apertures.

In order then to fasten and seal the top and bottom of the gauge in tight relation so that there can be no escape of the contained fluid, the top shown in Figure 2 is correctly positioned on the bottom shown in Figure 1, it being understood that the top must be revolved around a vertical axis through 180° so that the channels 13 are disposed between the channels 16, and these parts are bolted or screwed together by the means 12. A suitable sealing fluid is then introduced through the apertures 19 into the cementing channels. These channels are filled, and if desired, a pressure head may be built up in these channels so as to provide a ready flow from these channels along the surface 20 between the parts 10 and 11. The sealing fluid, however, is so chosen that capillary attraction will tend to cause a flow along the surface 20 between the parts 10 and 11, and the sealing means is such that it provides a tight seal between the parts and may provide a seal in channels 16, 17 and 18, though it will be understood that this may be left open to provide for the introduction of additional sealing fluid should any leak occur between the surfaces.

It has been found desirable to use a sealing fluid which has an affinity for the material of the parts to be sealed, such that the fluid because of this property will cause the surfaces to have sealing relation with each other. For instance, it has been found that pieces of celluloid may be sealed together merely by the introduction of acetone between these surfaces; or shellac compositions may be sealed by the introduction of acetone and shellac or alcohol, or the introduction of alcohol alone, between the surfaces of such compositions. In other words, it is possible to provide a solvent to seal surfaces between certain compositions. Or, expressing it still differently, certain materials which are contained in the compositions to be sealed have been found to have properties such as will cause these compositions to be sealed when such materials are introduced between the juxtaposed compositions.

It is to be understood that I do not wish to be limited to the exact embodiment of the method described as it will be readily appreciated that other devices may be sealed as well as other compositions than those described may be employed to seal different devices by different means peculiar to properties of such devices.

I claim:

1. The method of sealing parts to be joined along surfaces thereof including providing elongated indentations in at least one of the surfaces of one of said parts, access being provided to said indentations through means in one of said parts, fastening said parts in juxtaposition with the indentations of one of said parts adjacent the other part, and introducing a solvent into said indentations for sealing the abutting surfaces of the parts.

2. The method of forming a device of the character described which consists of forming parts of certain materials in the proper form, providing elongated indentations in a surface of at least one of said parts, said indentations being spaced and separate from the working parts of the device, and accessible from another surface of said parts, bolting said parts together, the indentations being disposed adjacent the surfaces to be sealed, and introducing a solvent into said indentations, said solvent being capable of spreading over the juxtaposed surfaces for sealing said surfaces.

3. The method of forming a device of the character described which consists of forming parts of certain materials in the proper form, providing elongated indentations in a surface of at least one of said parts, said indentations being spaced and separate from the working parts of the device, and accessible from the other surface of said parts through apertures registering with said indentations, securing said parts together, the indentations being disposed adjacent the surfaces to be sealed, and introducing a solvent through said apertures and into said indentations, said solvent being adapted to spread by capillary attraction completely between said surfaces to act with the materials of which said parts are made to thereby seal said parts.

4. In an article of manufacture, the combination of a pair of members disposed in juxtaposition to each other, at least one of said members being provided with elongated indentations and openings communicating with said indentations for the introduction of a solvent to said indentations whereby said pair of members may be sealed by the action of said solvent on the adjacent surfaces of said members.

5. In an article of manufacture, the combination of a pair of members disposed in juxtaposition to each other, securing means cooperating with said members for retaining said members in fixed relative position, at least one of said members being provided with elongated channels spaced from said securing means, at least one of said members having apertures communicating with said channels adjacent the ends thereof whereby a solvent common to said members may be introduced to said channels for substantially the entire length thereof so that said solvent will be communicated to substantially the entire juxtaposed surfaces of said members to thereby completely seal said members together in fluid tight relation.

Signed at Rochester, Penn., this 5th day of July, 1927.

JACK D. SARTAKOFF.